(12) United States Patent
Kim et al.

(10) Patent No.: US 10,866,686 B2
(45) Date of Patent: Dec. 15, 2020

(54) METHOD AND TERMINAL FOR RECOGNIZING TEXT

(71) Applicant: SAMSUNG ELECTRONICS CO., LTD., Suwon-si (KR)

(72) Inventors: Min-soo Kim, Yongin-si (KR); Hyon-sok Lee, Seoul (KR); Tae-kwon Chang, Seoul (KR); Ji-woong Choi, Seoul (KR); Jong-youb Ryu, Hwaseong-si (KR); Hae-in Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/475,579

(22) PCT Filed: Jan. 2, 2018

(86) PCT No.: PCT/KR2018/000053
§ 371 (c)(1),
(2) Date: Jul. 2, 2019

(87) PCT Pub. No.: WO2018/124849
PCT Pub. Date: Jul. 5, 2018

(65) Prior Publication Data
US 2020/0034000 A1 Jan. 30, 2020

(30) Foreign Application Priority Data
Jan. 2, 2017 (KR) .......................... 10-2017-0000338

(51) Int. Cl.
*G06F 17/00* (2019.01)
*G06F 3/0481* (2013.01)
(Continued)

(52) U.S. Cl.
CPC ............ *G06F 3/0481* (2013.01); *G06F 3/023* (2013.01); *G06F 3/04883* (2013.01); *G06F 40/10* (2020.01); *G06K 9/3258* (2013.01)

(58) Field of Classification Search
CPC .... G06F 3/0481; G06F 3/04883; G06F 3/023; G06F 3/04886; G06F 40/10; G06K 9/3258; G06K 9/2081; G06K 2209/01
See application file for complete search history.

(56) References Cited

U.S. PATENT DOCUMENTS 6,631,346 B1 * 10/2003 Karaorman ......... G10L 15/1822
704/275
7,903,875 B2 * 3/2011 Fujita ................... G06K 9/2054
382/175
(Continued)

FOREIGN PATENT DOCUMENTS

JP 7-44299 A 2/1995
JP 8-286804 A 11/1996
(Continued)

OTHER PUBLICATIONS

Communication dated Nov. 11, 2019, from the European Patent Office in counterpart European Application No. 18734020.3.
(Continued)

*Primary Examiner* — Laurie A Ries
(74) *Attorney, Agent, or Firm* — Sughrue Mion, PLLC

(57) ABSTRACT

Provided is a method of recognizing text in a terminal, the method including generating first tag information about a kind of language set in a user interface (UI) for inputting text and a location of a cursor at a time point when a text input has started, when the UI for inputting text displayed on the terminal is executed; when a language switch request that requests the terminal to switch the kind of language set in the UI is received, generating second tag information about a kind of switched language and a location of the cursor at a
(Continued)

time point of receiving the language switch request; when the text input is finished, storing a screen image of the terminal; and recognizing the text input to the terminal based on at least one piece of tag information and the screen image.

15 Claims, 12 Drawing Sheets

(51) Int. Cl.
*G06F 40/10* (2020.01)
*G06F 3/023* (2006.01)
*G06F 3/0488* (2013.01)
*G06K 9/32* (2006.01)

(56) References Cited

U.S. PATENT DOCUMENTS

| | | | | |
|---|---|---|---|---|
| 8,918,826 B2* | 12/2014 | Jeon | ................... | H04N 21/2353 348/114 |
| 10,503,797 B2* | 12/2019 | Hoshino | ............... | G06F 3/0484 |
| 2005/0198568 A1* | 9/2005 | Matsuzaki | ............. | G06F 40/177 715/227 |
| 2007/0083534 A1* | 4/2007 | Uematsu | ............. | G06F 16/9577 |
| 2009/0299730 A1* | 12/2009 | Joh | ....................... | G06F 40/232 704/9 |
| 2011/0016403 A1* | 1/2011 | Shibukawa | ....... | H04M 1/72561 715/738 |
| 2011/0081952 A1* | 4/2011 | Song | .................. | H04N 1/00424 455/566 |
| 2013/0108115 A1* | 5/2013 | Hwang | .................. | G06K 9/033 382/106 |
| 2015/0161099 A1* | 6/2015 | Lee | ......................... | G06F 9/454 345/171 |
| 2016/0012315 A1* | 1/2016 | Perrin | .................. | G06K 9/2063 382/161 |
| 2016/0078245 A1* | 3/2016 | Amarendran | ........... | H04L 67/10 713/193 |
| 2016/0179976 A1* | 6/2016 | Piesche | ................. | G06F 40/106 715/234 |
| 2016/0306775 A1* | 10/2016 | Hoshino | ................... | G06F 7/20 |
| 2017/0109391 A1* | 4/2017 | Rosen | ................. | G06F 16/2291 |

FOREIGN PATENT DOCUMENTS

| | | | |
|---|---|---|---|
| JP | 10-334092 A | | 12/1998 |
| JP | 2002091962 A | * | 3/2002 |
| JP | 4566740 B2 | | 10/2010 |
| KR | 10-2006-0040189 A | | 5/2006 |

OTHER PUBLICATIONS

Chia-Chi Lin et al. "Screenmilker: How to Milk Your Android Screen for Secrets" Proceedings 2014 Network Distributed System Security Symposium, Feb. 23, 2014, (14 pages total) XP055171931.
Search Report dated Apr. 9, 2018, issued by the International Searching Authority in International Application No. PCT/KR2018/000053 (PCT/ISA/210).
Intent Android Developers, "ACTION_LOCALE_CHANGED" Retrieved from "https://developer.android.com/reference/android/content/Intent.html#ACTION_LOCALE_CHANGED", 1 page total.
Anonymous, "Locale", Wikipedia, Retrieved from "https://en.wikipedia.org/w/index.php?title=Locale&oldid=886090812", 1 page total.

* cited by examiner

METHOD AND TERMINAL FOR RECOGNIZING TEXT

TECHNICAL FIELD

The present disclosure relates to a method of recognizing text, a terminal for recognizing text, and a computer-readable recording medium having embodied thereon a program for executing the method of recognizing text.

BACKGROUND ART

As information technology (IT) has developed, various applications and content providing services for providing a user with information are being developed. Recently, various techniques have been developed to provide a personalized service after analyzing preferences of a user. As an example of grasping preferences of a user, a text recognition technique may be used, wherein the text recognition technique recognizes text input by a user to a terminal and derives a keyword that the user is interested in.

In addition, a database including analyzed characteristics of text according to a kind of text language is necessary for recognizing the text. According to the related art, a combined database storing characteristics of all kinds of languages is used to recognize text, but it takes a long time to recognize text and efficiency in using resources such as a memory degrades.

DESCRIPTION OF EMBODIMENTS

Technical Problem

Provided are a method and a terminal for recognizing text, which may effectively use resources that are consumed to recognize text by generating tag information whenever a kind of language of a user interface (UI) for inputting text is switched during text input, and recognizing the text by using a database for each kind of language according to generated tag information.

Solution to Problem

According to an aspect of the present disclosure, a method of recognizing text in a terminal, the method includes: generating first tag information about a kind of language set in a user interface (UI) for inputting text and a location of a cursor at a time point when a text input has started, when the UI for inputting text displayed on the terminal is executed; when a language switch request that requests the terminal to switch the kind of language set in the UI is received, generating second tag information about a kind of switched language and a location of the cursor at a time point of receiving the language switch request; when the text input is finished, storing a screen image of the terminal; and recognizing the text input to the terminal based on at least one piece of tag information and the screen image.

BEST MODE

Figure 1:
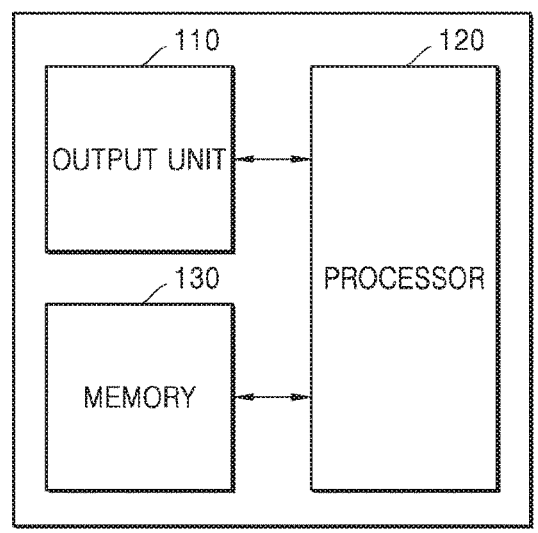
FIGS. 1 and 2 are block diagrams of a terminal for recognizing text, according to an embodiment.

According to an aspect of the present disclosure, a method of recognizing text in a terminal, the method includes: generating first tag information about a kind of language set in a user interface (UI) for inputting text and a location of a cursor at a time point when a text input has started, when the UI for inputting text displayed on the terminal is executed; when a language switch request that requests the terminal to switch the kind of language set in the UI is received, generating second tag information about a kind of switched language and a location of the cursor at a time point of receiving the language switch request; when the text input is finished, storing a screen image of the terminal; and recognizing the text input to the terminal based on at least one piece of tag information and the screen image.

The method may further include identifying a kind of an application being displayed on a screen of the terminal, on which the UI is displayed, wherein the generating of the first tag information may include generating the first tag information when the kind of the application that is identified is included in a target application list set in advance.

The method may further include recognizing at least one icon displayed on a screen of the terminal, on which the UI is displayed, wherein the generating of the first tag information includes generating the first tag information when the icon is included in a target icon set in advance.

The recognizing of the text may include: obtaining a target region from the screen image for recognizing the text, based on the information about the location of the cursor included in the at least one piece of tag information; and recognizing the text in the obtained target region based on the information about the kind of language included in the at least one piece of tag information.

The obtaining of the target region may include: obtaining a region between a first location, that is, a location of a cursor at the time when the text input has started and a second location, that is, a location of the cursor at the time of receiving the language switch request, as a first target region; and obtaining a region between the second location and a third location, that is, a location of the cursor at the time when the text input is finished, as a second target region.

In the recognizing of the text, a text displayed on the first target region may be recognized based on a kind of language included in first tag information, and a text displayed on the second target region may be recognized as a kind of language included in the second tag information.

The method may further include, when an event in which the location of the cursor is changed to a direction different from a preset direction occurs, updating the at least one piece of tag information based on a location of the cursor after the event.

The method may further include: when an event in which copied text is added occurs in the terminal, storing information about a location of the cursor at a time point when the event occurs and the copied text; and updating the at least one piece of tag information based on the stored information.

The recognizing of the text may include: identifying a region corresponding to a copied text from a screen image based on the stored information; and recognizing a text of a region except for the identified region in the screen image, based on at least one piece of tag information, wherein the recognized text and the copied text are combined.

The at least one piece of tag information may further include information about at least one of a time of finishing the text input and a time of inputting text for each kind of language.

According to an aspect of the present disclosure, a terminal for recognizing text, the terminal includes: an output unit configured to display a user interface (UI) for inputting text to the terminal; a processor configured to, when the UI is executed, generate first tag information about a kind of language set in the UI and a location of a cursor at a time when a text input has started, and when a language switch request that requests the terminal to switch the kind of language set in the UI is received in the terminal, generate second tag information about a kind of switched language and a location of the cursor at a time point of receiving the language switch request; and a memory storing a screen image of the terminal when the text input is finished, wherein the processor is configured to recognize the text input to the terminal based on the at least one piece of tag information and the stored screen image.

MODE OF DISCLOSURE

The terminology used herein will be described briefly, and the present disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Hereinafter, one or more embodiments of the present disclosure will be described in detail with reference to accompanying drawings to the extent that one of ordinary skill in the art would be able to carry out the present disclosure. However, the present disclosure may be implemented in various manners, and is not limited to one or more embodiments described herein. In addition, components irrelevant with the description are omitted in the drawings for clear description, and like reference numerals are used for similar components throughout the entire specification.

Figure 2:
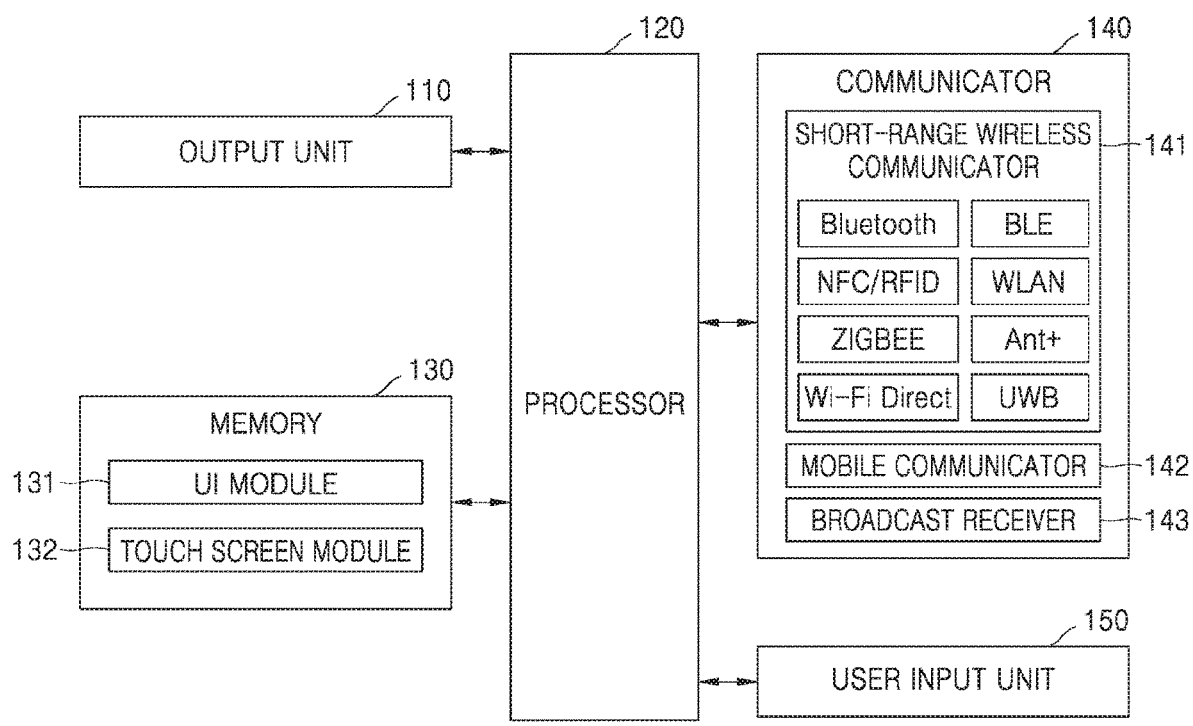

FIGS. 1 and 2 are block diagrams of a terminal 100 for recognizing text, according to an embodiment.

As shown in FIG. 1, the terminal 100 according to the embodiment may include an output unit 110, a processor 120, and a memory 130. However, not all the elements in FIG. 1 are essential elements. The terminal 100 may be embodied with more elements than the shown elements or may be embodied with fewer elements than the shown elements.

For example, as shown in FIG. 2, the terminal 100 may further include a communicator 140 and a user input unit 150, in addition to the output unit 110, the processor 120, and the memory 130.

Hereinafter, the elements will be described below.

The output unit 110 displays and outputs information obtained by the terminal 100.

The output unit 110 according to the embodiment may display a user interface (UI) for inputting text. Here, the UI for inputting text may include a keyboard UI, on which letters, numbers, and symbols are displayed. Also, the UI for inputting text may vary depending on a kind of language to which the letters belong. For example, a UI for inputting Korean and a UI for inputting English may be separately provided.

Also, when sensing a touch input of a user for requesting a UI for inputting text via a touch screen module 132 that will be described later or the user input unit 140, the output unit 110 may display the UI for inputting text. According to another embodiment, when sensing a request for the UI for inputting text sent from an input device such as a remote controller or a smartphone through the user input unit 140, the output unit 110 may display the UI for inputting text. In addition, the above input device is an example, and is not limited to the remote controller or the smartphone. In another embodiment, a wearable device may be also used as the input device.

The output unit 110 according to the embodiment may display a UI of at least one application executed on the terminal 100. An application is a set of series of computer programs developed to perform a certain task, e.g., a video searching application, a search application, a social network service (SNS) application, a messenger application, a shopping mall application, etc. However, the at least one application executed on the terminal 100 is not limited to the above examples.

Also, when a user input requesting the UI for inputting text is sensed while the application is executed on the terminal 100, the output unit 110 may display the UI for inputting text on at least a partial region of the UI of the executed application. For example, when a user input requesting the UI for inputting text is sensed during executing a video searching application, the output unit 110 may display the UI for inputting text on a lower end region of a UI of the video searching application.

When the user inputs text such as at least one of letters, numbers, and symbols through the UI for inputting text, the output unit 110 may display the input text on a predetermined region of the UI of the application that is being displayed on the screen of the terminal 100. Here, the predetermined region may be set to display a text generated by the user input in the application. For example, a search window may be included in the predetermined region in a case of the searching application.

In addition, when the output unit 110 configures a layered structure with a touch pad to be implemented as a touch screen, the output unit 110 may be also used as an input device, as well as the output device. The output unit 110 may include at least one of a liquid crystal display, a thin film transistor-liquid crystal display, an organic light-emitting diode, a flexible display, a three-dimensional (3D) display, and an electrophoretic display. In addition, the terminal 100 may include two or more output units 110 according to an implementation type of the terminal 100. Here, the two or output units 110 may be arranged facing each other by using a hinge.

The processor 120 controls overall operations of the terminal 100. For example, when the processor 120 executes programs stored in the memory 130 to control the output unit 110, the communicator 140, and the user input unit 150.

As the UI for inputting text is executed, the processor 120 may generate first tag information regarding a kind of language set in the UI and a location of the cursor when the text input starts. Here, the cursor may be a symbol representing a location where the text may be input in the UI of the application displayed on the screen of the terminal 100. For example, when a Korean keyboard UI in the UI for inputting text is executed and a location where the input of Korean text starts is 0 px (pixel), the processor 120 may generate first tag information including information about Korean and 0 px. Also, according to another example, when the input of text in the language set in the keyboard UI is finished, the processor 120 may generate a location of the cursor at the time point of finishing the text input as the first tag information. For example, when a user input for requesting language switch is received, the processor 120 may store a location of the cursor at the time point of receiving the user input as a location of the cursor at the time point of finishing the text input.

However, in the specification, the location of the cursor included in the tag information is not limited to the location of starting the text input or the location of finishing the text input.

In addition, the processor 120 may obtain information about the kinds of language set in the UI from an operating system (OS). Alternatively, the processor 120 may identify the kind of language by recognizing a text value and a keyboard arrangement of the keyboard of UI displayed on the screen. For example, when texts such as ㄱ, ㄷ, ㄴ, ㄹ, etc. are displayed on the keyboard of the UI, the processor 120 may recognize the text and identify that the kind of language set in the UI is Korean. Here, the kind of language may be classified as French, German, Japanese, English, Korean, Chinese, etc., but the kinds of languages described herein are not limited to the above examples.

Also, when the terminal 100 receives a request for text switch that requests the terminal 100 to switch the kind of language set in the UI for inputting text, the processor 120 may generate second tag information regarding a kind of switched language and a location of the cursor at the time of receiving the switch request. The processor 120 may obtain a user input for selecting a language switch key, etc. displayed on the UI for inputting text as the request for language switch. Also, according to another example, the processor 120 may determine whether the text value of the keyboard displayed on the UI for inputting text or the keyboard arrangement has changed, and may determine whether the kind of language set in the UI for inputting text is switched.

For example, when the user selects a Korean/English switching key that request switching of language setting in the Korean keyboard UI that is currently displayed, the processor 120 may identify a location of the cursor at the time when the Korean/English switching key is selected. When the identified location of the cursor is 150 px, the processor 120 may generate second tag information including information about English and 150 px.

In addition, one or more embodiments are not limited to the above example, that is, the tag information may further include information about a location of the cursor when the text input in the switched language is finished and input time of the text in the switched language, as well as the kind of language and the location of the cursor when the language switch request is received.

Also, when it is determined that the text input is finished, the processor 120 may capture an image of the screen of the terminal 100 to generate a screen image. For example, as an event of finishing the UI for inputting text occurs, the processor 120 may identify that the text input is finished through a notification of the event of finish provided from the OS. According to another embodiment, when the UI for inputting text is removed from the screen, the processor 120 may determine that the text input is finished. The processor 120 may store the screen image in the memory 130.

The processor 120 according to the embodiment may recognize the text input to the terminal 100 based on at least one generated tag information and the stored screen image. The processor 120 may obtain a target region for recognizing text from the screen image, based on the information about the location of the cursor included in the at least one tag information. Here, the target region may denote a region to which an optical character recognition (OCR) technique is applied by the processor 120 to recognize text.

For example, the processor 120 may identify a first location, that is, the location of the cursor at the time when the text input has started and a second location, that is, the location of the cursor at the time of receiving the language switch request, based on the first tag information and the second tag information. The processor 120 may obtain a region between the first location and the second location as a first target region. Also, the processor 120 may obtain a region between the second location and a third location, that is, a location of the cursor at the time when the text input is finished, as a second target region.

In addition, the processor 120 may recognize text included in the first target region by comparing a Korean database with the first target region according to the language information included in the first tag information. The processor 120 may also recognize text included in the second target region by comparing an English database with the second target region according to the language information included in the second tag information.

When an event in which the location of the cursor is changed to a direction different from a preset direction occurs, the processor 120 may update the at least one piece of the tag information based on the location of the cursor after the event has occurred. Here, the event in which the location of the cursor is changed to a direction different from the preset direction may include a text deletion event, a cursor movement event, etc. The preset direction may be, for example, a right direction in which the input text is sequentially arranged, but may be set differently according to the user input. This will be described in detail below with reference to FIGS. 8 and 9.

When an event in which a copied text is added occurs, the processor 120 may store information about the location of the cursor at the time when the event occurs and information about the copied text. The processor 120 may update the at least one piece of tag information based on the stored information. This will be described in detail with reference to FIGS. 10 and 11.

In addition, the processor 120 according to the embodiment may execute processes of generating the tag information only when the application that is being executed on a top process in the OS of the terminal 100 is included in a target application list set in advance. Here, the application being executed on the top process of the OS may be displayed on the screen of the terminal. This will be described in detail below with reference to FIG. 6. According to another embodiment, the processor 120 may perform the process of generating the tag information only when an icon displayed on the screen of the terminal 100 is included in an icon list set in advance. This will be described in detail below with reference to FIG. 7.

The memory 130 may store a program for processing and controlling the processor 120 and input/output data (e.g., texts).

The memory 130 may include a storage medium of at least one type of a flash memory type, a hard disk type, a multimedia card micro type, a card type memory (e.g., an SD or XD memory, etc.), random access memory (RAM), a static RAM (SRAM), a read-only memory (ROM), an electrically erasable programmable ROM (EEPROM), a programmable (PROM), a magnetic memory, a magnetic disk, and an optical disk. Also, the terminal 100 may manage a Web storage or a cloud server performing a storage function of the memory 130 on Internet.

The programs stored in the memory 130 may be classified as a plurality of modules according to functions thereof, for example, a UI module 131, a touch screen module 132, etc.

The UI module 131 may provide a specific UI, GUI, etc. linked with the terminal 100 to each application. For example, the UI module 131 may provide a UI with a search window that is specialized to a search application. Also, when receiving a request for UI for inputting text while the search application is being executed, the UI module may control each UI so that the UI for inputting text may overlap on the UI of the search application. However, one or more embodiments are not limited thereto, that is, the kinds of UIs of the applications controlled by the UI module 131 are not limited to the above examples.

The touch screen module 132 senses a touch gesture of the user on the touch screen, and may transmit information about the touch gesture to the processor 120. For example, when the user touches a language switch key on the UI for inputting text, the touch screen module 132 may transfer information notifying that the user requests switching of the language to the processor 120. The touch screen module 132 according to the embodiment may recognize and analyze a touch code. The touch screen module 132 may be configured as additional hardware including a controller.

In order to sense a touch or a proximity touch on the touch screen, various sensors may be provided in or around the touch screen. An example of the sensor for sensing the touch on the touch screen may include a tactile sensor. A tactile sensor is a sensor for sensing contact of a certain object at a human sense level or higher. The tactile sensor may sense various information such as roughness of a contact surface, hardness of a contact material, a temperature at a contact point, etc.

Also, an example of the sensor for sensing the touch on the touch screen may include a proximity sensor.

The proximity sensor denotes a sensor for sensing an existence of an object approaching a predetermined detect surface or an object around the detect surface by using an electromagnetic field or an infrared ray, without a physical contact. The touch input of the user may include a tap gesture, a touch & hold gesture, a double tap gesture, a drag gesture, a panning gesture, a flick gesture, a drag & drop gesture, a swipe gesture, or the like. For example, the user may request the language switching in the UI for inputting text, by using one of the examples of the touch input.

The communicator 140 may include one or more elements allowing the terminal 100 to communicate with an external server (e.g., a Web server) or an external device (e.g., an input device). For example, the communicator 140 may include a short-range wireless communicator 141, a mobile communicator 142, and a broadcast receiver 143.

The short-range wireless communicator 141 may include, but is not limited to, a Bluetooth communicator, a Bluetooth low energy (BLE) communicator, a near field communication unit, a WLAN (Wi-Fi) communicator, a ZigBee communicator, an infrared-ray data association (IrDA) communicator, a Wi-Fi direct (WFD) communicator, an ultra wideband (UWB) communicator, an Ant+ communicator, etc. For example, the short-range wireless communicator 141 may receive a signal requesting a text input to the terminal 100 from an external device located at a near distance from the terminal 100.

The mobile communicator 142 may transmit/receive a wireless signal to/from at least one of a base station, an external terminal, and a server on a mobile communication network. Here, the wireless signal may include data for executing the application provided on the terminal 100. For example, the mobile communicator 142 may transmit to the Web server a text representing an object that is requested to be searched for by the user through the search application. In another example, the mobile communicator 142 may receive data including a search result from the Web server.

The broadcast receiver 143 receives a broadcast signal and/or broadcast-related information from outside via a broadcast channel. For example, when a digital multimedia broadcasting (DMB) application is executed on the terminal 100, the broadcast receiver 143 may receive an electronic program guide (EPG) of a broadcast channel corresponding to the text input by the user. The broadcast channel may include satellite channels and terrestrial channels. In some embodiments, the terminal 100 may not include the broadcast receiver 143.

The user input unit 150 is a unit to which data for controlling the terminal 100 is input by the user. For example, the user input unit 150 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like.

The user input unit 150 may obtain the user input for requesting the UI for inputting text through the touch input or through the input device. In addition, in another example, the user input unit 150 may obtain a text that the user wants to input through the touch input or the input device. In another example, the user input unit 150 may obtain a language switch request through the touch input of the user or the input device.

FIGS. 3A to 3D are diagrams illustrating a method of recognizing text by the terminal 100, according to an embodiment.

A method of recognizing text when a video searching application is executed on the terminal 100 will be described below with reference to FIGS. 3A to 3D. However, one or more embodiments are not limited thereto, that is, the application executable on the terminal 100 is not limited to the video searching application.

Figure 3A:
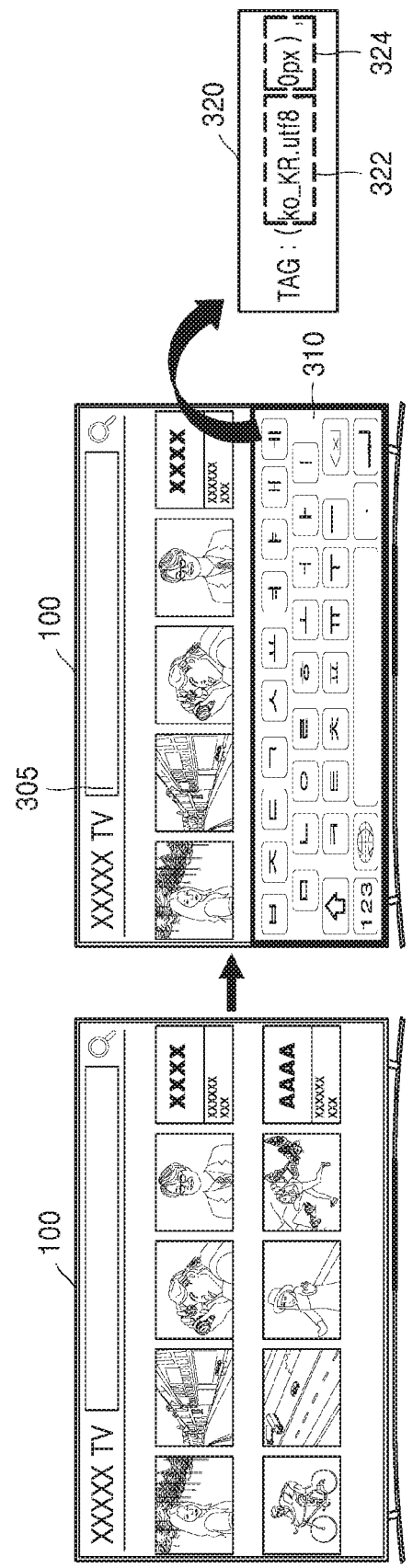
FIGS. 3A to 3D are diagrams illustrating a method of recognizing text in a terminal, according to an embodiment.

Referring to FIG. 3A, the video searching application may be executed on the terminal 100. When a user requests a UI for inputting text in order to input text in a search window of the video searching application, the terminal 100 may display a first keyboard UI 310 on a screen of the terminal 100. Here, the user may request the UI for inputting text by touching the search window of the video searching application displayed on the screen of the terminal 100 or through the input device. In addition, it is assumed that the first keyboard UI 310 that is initially displayed according to the user input is set in Korean.

As the first keyboard UI 310 is executed, the terminal 100 may generate first tag information 320 regarding a kind of language set in the first keyboard UI 310 and a location of a cursor 305 at the time when text input starts. For example, the first tag information 320 may include a piece of information 322 representing Korean and a piece of information 324 representing 0 px, that is, the location of the cursor 305.

Figure 3B:
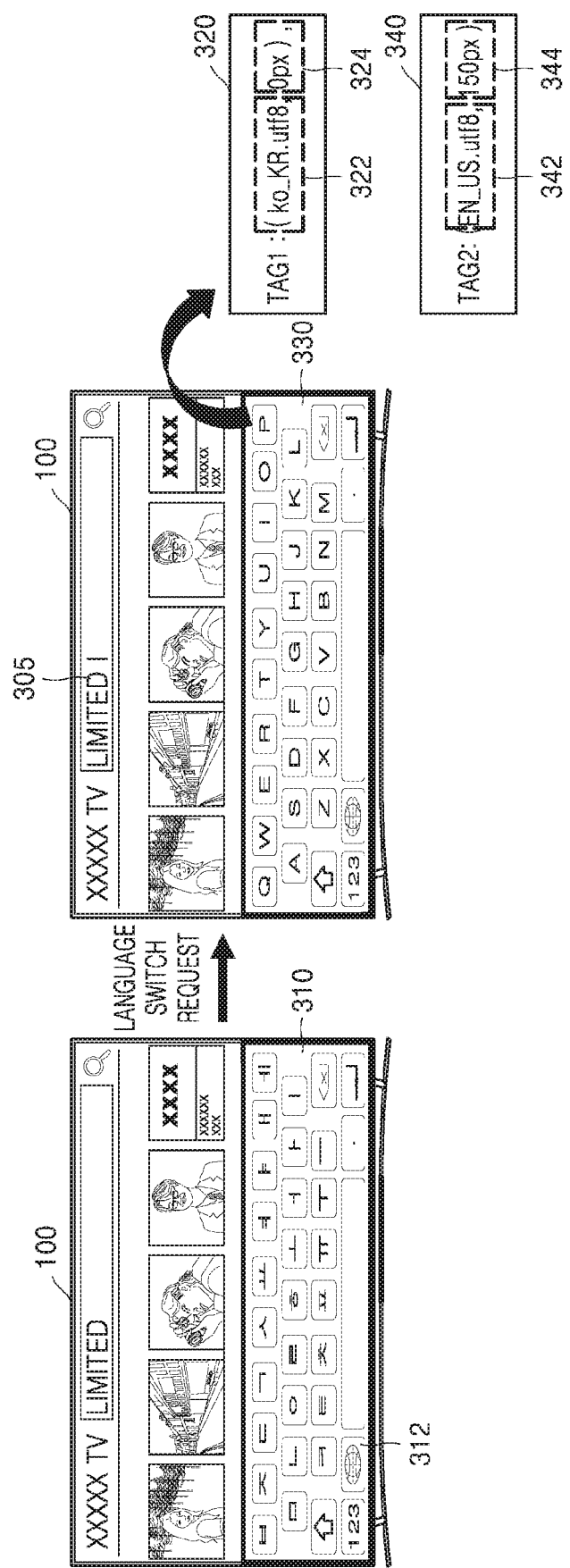

Referring to FIG. 3B, the terminal 100 may display text input via the first keyboard UI 310 on the search window. For example, the terminal 100 may display Korean text, for example, "한정판", in the search window.

In addition, the terminal 100 may receive a language switch request through a touch input of the user or the input device. For example, when the user touches a language switch key 312 on the first keyboard UI 310 or selects the language switch key 312 through the input device, the terminal 100 may receive the language switch request.

When receiving the language switch request, the terminal 100 may switch the first keyboard UI 310 to a second keyboard UI 330. In the embodiment, it is assumed that the second keyboard UI 330 is set in English.

Also, when receiving the language switch request, the terminal 100 may generate second tag information 340 regarding a kind of language set in the second keyboard UI 330 and a location of the cursor 305 at the time of receiving the language switch request. For example, the second tag information 340 may include a piece of information 342 representing English and a piece of information 344 representing 150 px, that is, the location of the cursor 305. Accordingly, the first tag information 320 and the second tag information 340 that are tag information about the text input by the user may be generated in the terminal 100.

Figure 3C:
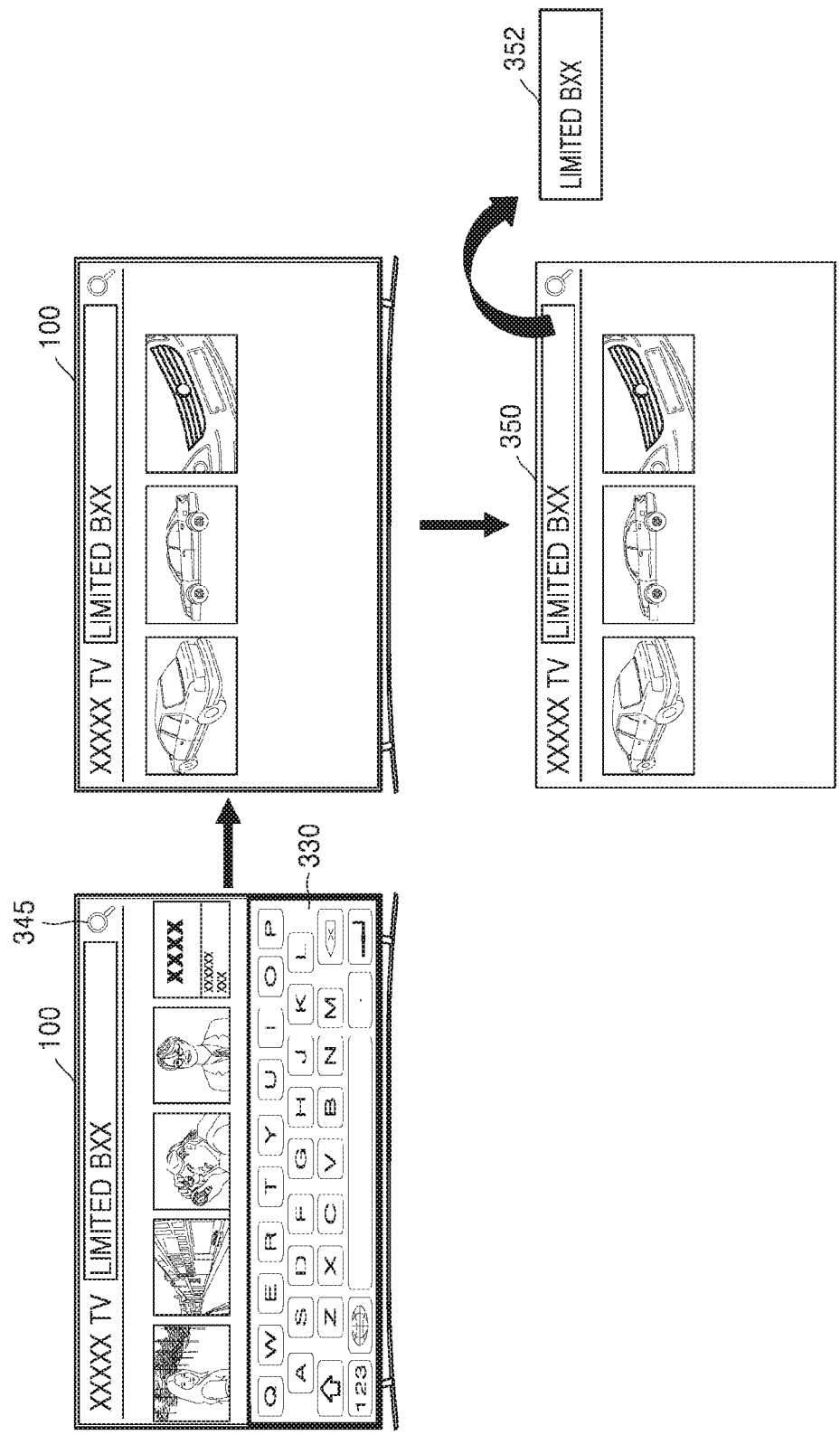

Referring to FIG. 3C, the terminal 100 may determine whether the text input is finished based on the user input. For example, when the user selects an icon 345 for requesting search for the text input in the search window of the video searching application after finishing the text input, the terminal 100 may determine that the text input of the user is finished.

As it is determined that the text input is finished, the terminal 100 may obtain a screen image 350 of the terminal 100. For example, the terminal 100 may obtain the screen image 350 by capturing the image of the screen. Also, the terminal 100 may select a region in which the text is input by selecting a region 352 corresponding to the search window in the screen image 360. However, one or more embodiments are not limited thereto, that is, information about a region where the text is input may be stored in advance in each of at least one application executed on the terminal 100.

Figure 3D:
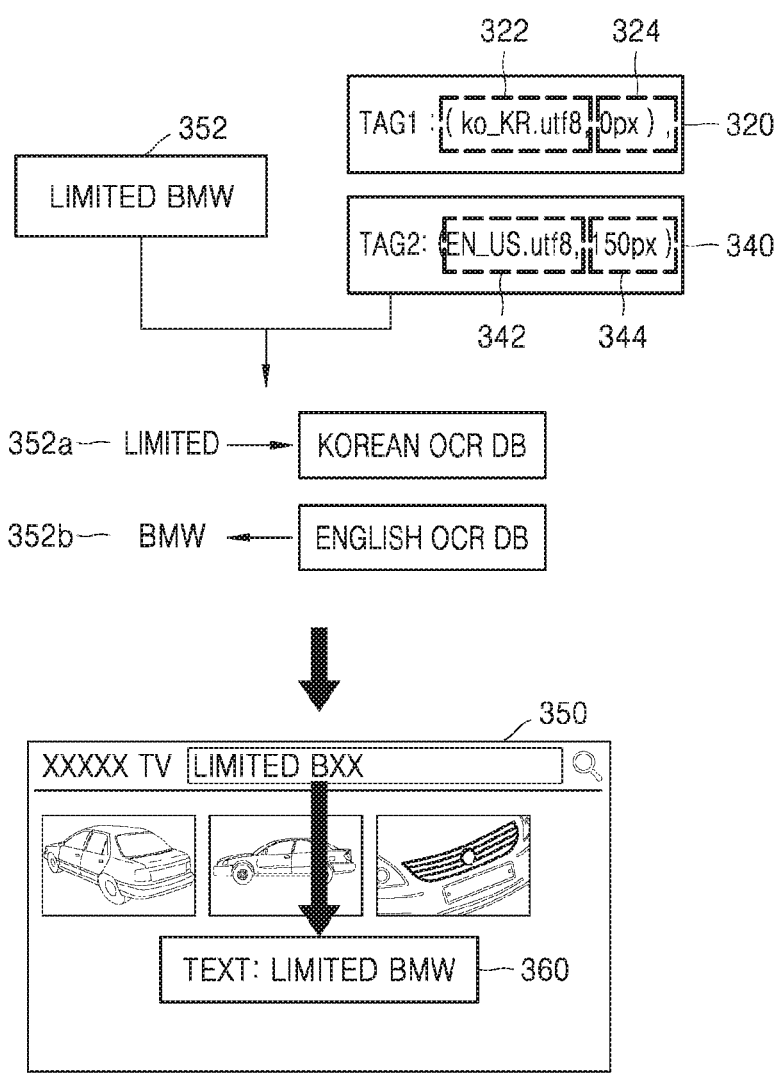

Referring to FIG. 3D, the terminal 100 may divide the region 362 corresponding to the search window into target regions 362a and 362b for recognizing the text based on the first tag information 320 and the second tag information 340. For example, the terminal 100 may obtain the first target region 352a that is a region between 0 px and 150 px, based on the information 324 representing 0 px that is the location of the cursor 305 included in the first tag information 320 and the information 344 representing 150 px that is the location of the cursor 305 included in the second tag information 340. Also, the terminal 100 may obtain the second target region 352b corresponding to a remaining region except for the first target region 352a in the region 352 corresponding to the search window.

However, according to another example, the second target region 352b may be divided from the region 352 corresponding to the search window, by using the information 344 representing 250 px that is the location of the cursor 305 included in the second tag information 340 and the location information of the cursor 305 at the time of finishing the text input.

The terminal 100 according to the embodiment may recognize the text in the first target region 352a based on the first target region 352a and the information 322 representing Korean included in the first tag information 320. For example, the terminal 100 may identify that the language of the text included in the first target region 352a is Korean based on the information 322 representing Korean. Accordingly, the terminal 100 may recognize the text displayed on the first target region 352a by using Korean OCR database (DB).

Also, the terminal 100 may recognize the text in the second target region 352b based on the second target region 352b and the information 342 representing English included in the second tag information 340. For example, the terminal 100 may identify that the language of the text included in the second target region 352b is English based on the information 342 representing English. Accordingly, the terminal 100 may recognize the text displayed on the second target region 352b by using an English OCR DB.

The terminal 100 may recognize that a text 360, that is, "Limited BXX", on the screen image 350, by combining a result of recognizing text in the first target region 352a and a result of recognizing text in the second target region 352b.

Figure 4:
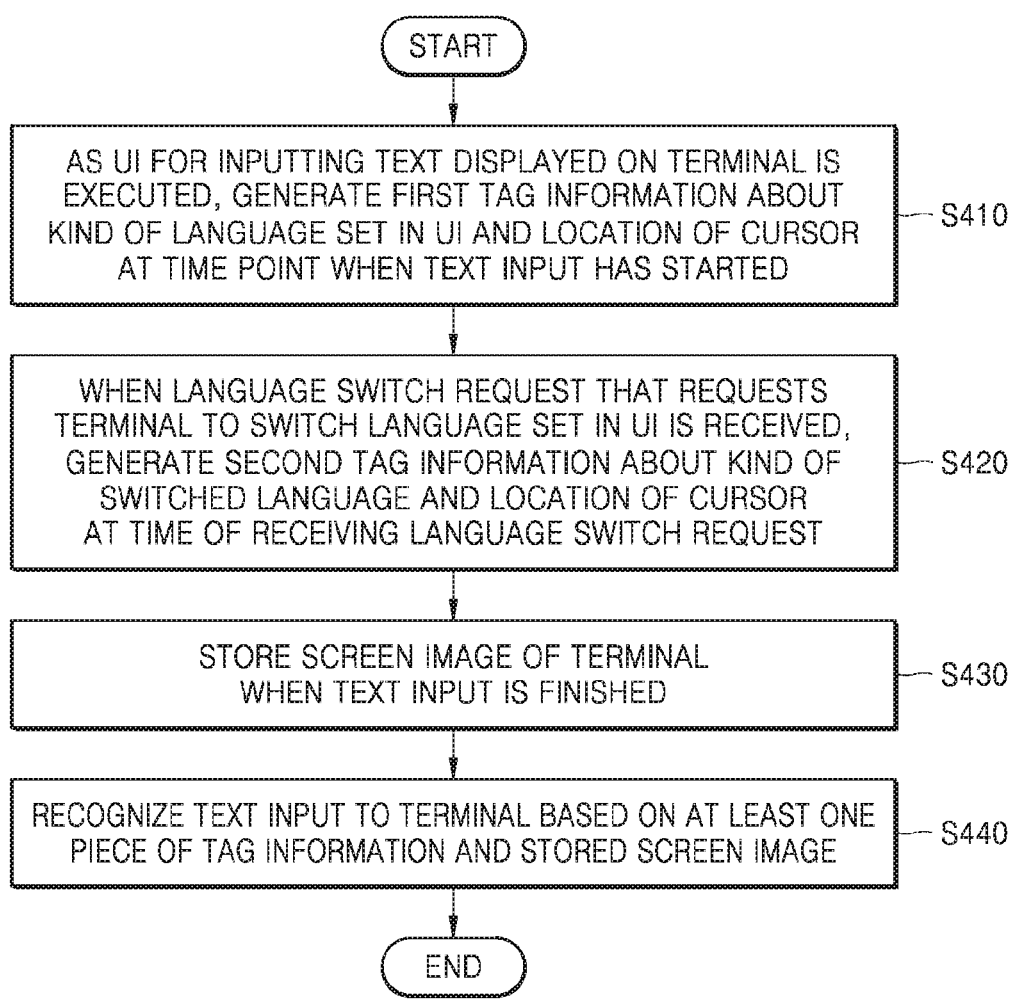
FIG. 4 is a flowchart illustrating a method of recognizing text in a terminal, according to an embodiment.

FIG. 4 is a flowchart illustrating a method of recognizing text by the terminal 100, according to an embodiment.

In operation S410, as the UI for inputting text displayed on the terminal 100 is executed, the terminal 100 may generate first tag information about the kind of language set in the UI and a location of a cursor at the time when the text input starts.

For example, the terminal 100 may receive a user input that requests execution of the UI for inputting text. As the user input requesting the execution of the UI for inputting text is received, the terminal 100 may display the UI for inputting text on a preset region of a screen, on which a UI of an application is being displayed.

Also, the terminal 100 may identify the kind of language set in the UI for inputting text, based on information obtained from the OS. However, one or more embodiments are not limited to the above example of identifying the kind of language set in the UI in the terminal 100. According to another example, the terminal 100 may identify the kind of language set in the UI based on a text value of a keyboard displayed on the UI or keyboard arrangement.

The terminal 100 may identify a location of the cursor at the time when the text input has started. The location of the cursor may be identified as location information of the pixel, on which the cursor is displayed, from among a plurality of pixels in the screen of the terminal 100.

In operation S420, when the terminal 100 receives a request for language switch that requests the terminal 100 to switch the kind of language set in the UI, the terminal 100 may generate second tag information regarding a kind of switched language and a location of the cursor at the time of receiving the switch request.

The terminal 100 according to the embodiment may receive the language switch request while the text is input in the terminal 100. For example, when the user touches a language switch key displayed on the UI for inputting text or selects a language switch key in an input device, the terminal 100 may receive the language switch request. However, one or more embodiments are not limited to the above example of receiving the language switch request in the terminal 100.

In operation S430, when the text input is finished, the terminal 100 may store a screen image of the terminal 100.

The terminal 100 according to the embodiment may determine whether the text input is finished. For example, when receiving a user input for requesting termination of the text input or a user input for requesting execution of a next process (e.g., searching) after the text input, the terminal 100 may determine that the text input is finished.

When the text input is finished, the terminal 100 may capture an image of the screen thereof. Accordingly, the terminal 100 may store the captured image of the screen.

In operation S440, the terminal 100 may recognize the text input in the terminal 100, based on at least one piece of tag information and the stored screen image.

The terminal 100 according to the embodiment may obtain at least one target region for recognizing text from the stored screen image, based on the at least one piece of tag information. In addition, according to another embodiment, the terminal 100 may select a text input region from the stored screen image, based on information about the text input region set in advance according to kinds of applications. The terminal 100 may divide the text input region selected based on the at least one piece of tag information as at least one target region.

Also, the terminal 100 may select an OCR DB of the language corresponding to each of the at least one tag region, based on information about the kinds of languages included in the at least one piece of tag information. The terminal 100 may recognize the text included in each of the at least one tag region by using the OCR DB of the selected language.

Figure 5:
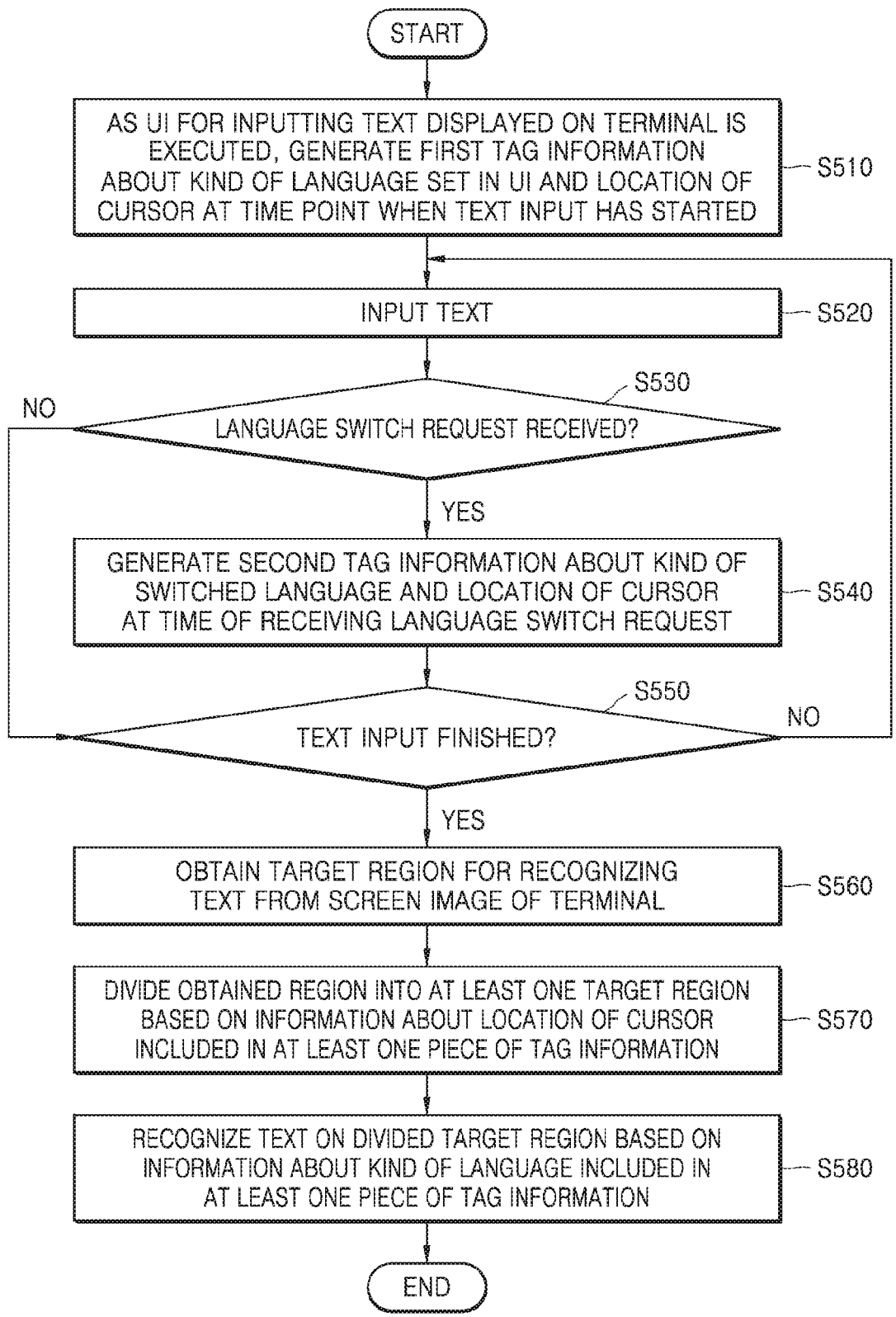
FIG. 5 is a flowchart illustrating in detail a method of recognizing text in a terminal, according to an embodiment.

FIG. 5 is a flowchart illustrating in detail the method of recognizing text by the terminal 100 according to an embodiment.

In operation S510, as the UI for inputting text displayed on the terminal 100 is executed, the terminal 100 may generate first tag information about the kind of language set in the UI and a location of a cursor at the time when the text input starts.

Operation S510 may correspond to operation S410 described above with reference to FIG. 4.

In operation S520, the terminal 100 may input text.

The terminal 100 according to the embodiment may input text that is obtained through a touch input of a user or obtained through an input device. Here, the input text may be displayed on the screen of the terminal 100.

In operation S530, the terminal 100 may determine whether a language switch request is received.

For example, the terminal 100 may determine whether the language switch request is received, by identifying whether the user touches a language switch key on the UI for inputting text or the user selects the language switch key through the input device.

In operation S540, the terminal 100 may generate second tag information about a kind of switched language and a location of the cursor at the time of receiving the language switch request.

When receiving the language switch request, the terminal 100 according to the embodiment may generate the second tag information about the kind of switched language and the location of the cursor at the time of receiving the language switch request.

In operation S550, the terminal 100 may determine whether the text input is finished.

The terminal 100 according to the embodiment may determine whether the text input is finished, after the second tag information is generated. According to another embodiment, when the language switch request is not received, the terminal 100 may determine whether the text input is finished.

In operation S560, the terminal 100 may obtain a region for recognizing text from the screen image of the terminal 100.

The terminal 100 according to the embodiment may obtain the region for recognizing the text from the screen image of the terminal 100, when it is determined that the text input is finished. Here, the region for recognizing the text may be set in advance according to the kind of application that is being executed on a top process of the OS of the terminal 100. For example, when the search application is being executed on the terminal 100, a region in the screen image, corresponding to the search window, may be obtained as the region for recognizing text. However, one or more embodiments are not limited thereto, that is, the terminal 100 may obtain the region for recognizing text from the screen image based on the at least one piece of tag information.

In operation S570, the terminal 100 may divide the obtained region into at least one target region, based on the information about the location of cursor included in the at least one piece of tag information.

For example, the terminal 100 may set a region between a first location, that is, a location of the cursor at the time when the text input has started, and a second location, that is, a location of the cursor at the time of receiving the language switch request, as the first target region. Also, the terminal 100 may set a region between the second location and a third location, that is, a location of the cursor at the time when the text input is finished, as the second target region.

However, one or more embodiments are not limited thereto, that is, the terminal 100 may obtain the other region than the first target region as the second target region.

In operation S580, the terminal 100 may recognize the text of the divided target region based on the information about the kind of language included in the at least one piece of tag information.

The terminal 100 according to the embodiment may recognize the text of the divided target region by using the OCR DB corresponding to the kind of language included in the at least one piece of tag information.

Figure 6:
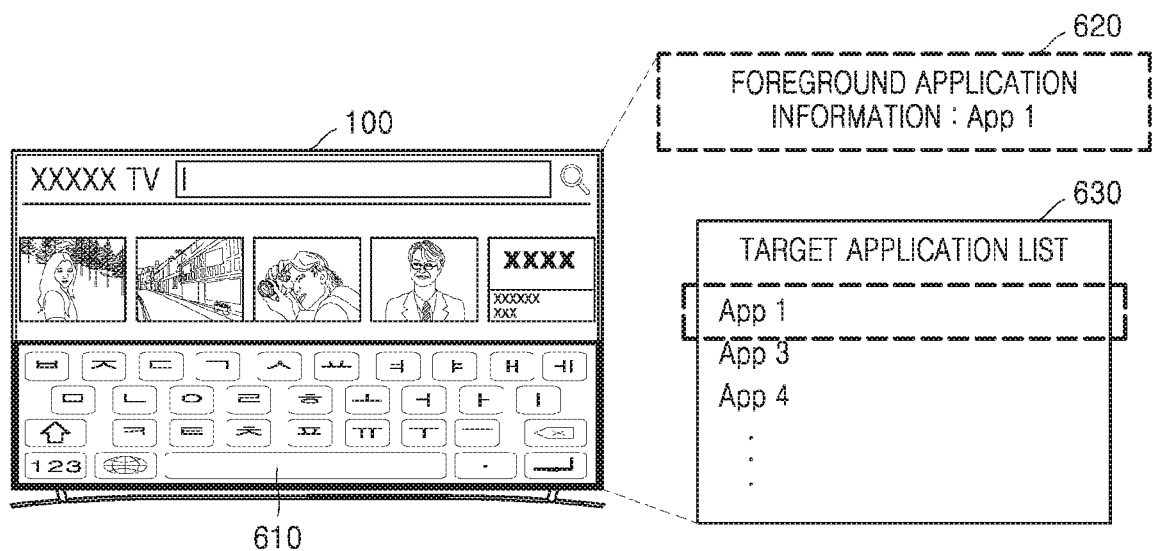
FIG. 6 is a diagram illustrating a method of generating tag information for recognizing text in a terminal according to a kind of an application being executed in a top process of an operating system (OS), according to an embodiment.

FIG. 6 is a diagram illustrating a method of generating tag information for recognizing text by the terminal 100 according to a kind of an application being executed in a top process of an OS, according to an embodiment.

Referring to FIG. 6, as a UI 610 for inputting text is executed, the terminal 100 may identify an application being executed in the top process of the OS in the terminal 100. For example, the terminal 100 may obtain information 620 about the application being executed in the top process of the OS, from the OS. In the embodiment, it is assumed that the application being executed in the top process of the OS of the terminal 100 is App 1.

In addition, in the terminal 100, a target application list 630 including identification information of at least one application that is necessary to generate tag information for recognizing text may be stored in advance. Applications included in the target application list 630 may be determined according to a setting of the user, but the method of determining the target application list 630 is not limited thereto.

The terminal 100 may determine whether an application being executed in foreground is included in the target application list 630 by comparing the information 620 about the application being executed in the top process of the OS with the target application list 630.

The terminal 100 may generate tag information for recognizing text, when the application App1 being executed in the top process of the OS is included in the target application list 630. Here, the method by which the terminal 100 generates the tag information for recognizing the text may correspond to the above method described with reference to FIGS. 1 to 5.

In addition, when the application being executed in the top process of the OS is not included in the target application list 630, the terminal 100 may not perform a series of processes for recognizing the text according to the embodiment. For example, when the application that is being executed is not included in the target application list 630, the terminal 100 may not generate tag information.

Figure 7:
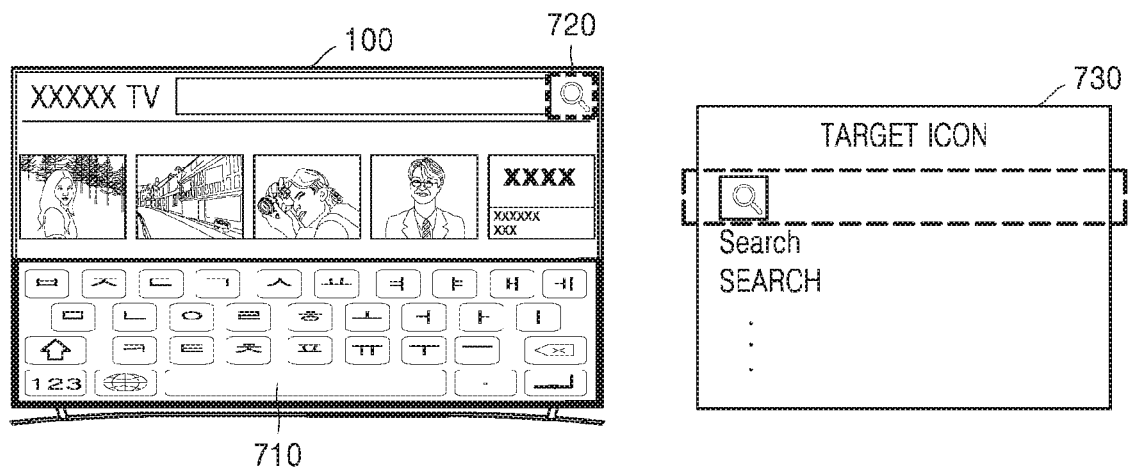
FIG. 7 is a diagram for illustrating a method of generating tag information for recognizing text according to a kind of an icon displayed on a screen of a terminal, according to an embodiment.

FIG. 7 is a diagram for illustrating a method of generating tag information for recognizing text according to a kind of an icon displayed on a screen of the terminal 100, according to the embodiment.

Referring to FIG. 7, the terminal 100 may recognize at least one icon displayed on the screen of the terminal 100, when a UI 710 for inputting text is executed. Here, the icon may include an image or a symbol set to correspond to each of programs, instructions, or files in order to designate the program, instruction, or files. In the embodiment, it is assumed that the icon recognized by the terminal 100 is a magnifier icon 720 (?).

In addition, the terminal 100 may store in advance a target icon list 730 including information about at least one icon that is necessary to generate tag information for recognizing the text. For example, the target icon list 730 may include a '검색' icon, a magnifier icon, search icon, etc. The icon included in the target icon list 730 may be determined according to setting of the user, but the method of determining the target icon list 730 is not limited thereto.

The terminal 100 may determine whether the icon 720 displayed on the screen of the terminal 100 is included in the target icon list 730, by comparing the icon 720 displayed on the screen of the terminal 100 with the target icon list 730.

The terminal 100 may generate tag information for recognizing text, when the icon 720 displayed on the screen of the terminal 100 is included in the target icon list 730. Here, the method of generating the tag information for recognizing text in the terminal 100 may correspond to the above method described with reference to FIGS. 1 to 5.

In addition, the terminal 100 may not perform a series of processes for recognizing text according to the embodiment, when the icon displayed on the screen of the terminal 100 is not included in the target icon list 730. For example, when the application that is being executed is not included in the target icon list 730, the terminal 100 may not generate tag information.

Figure 8:
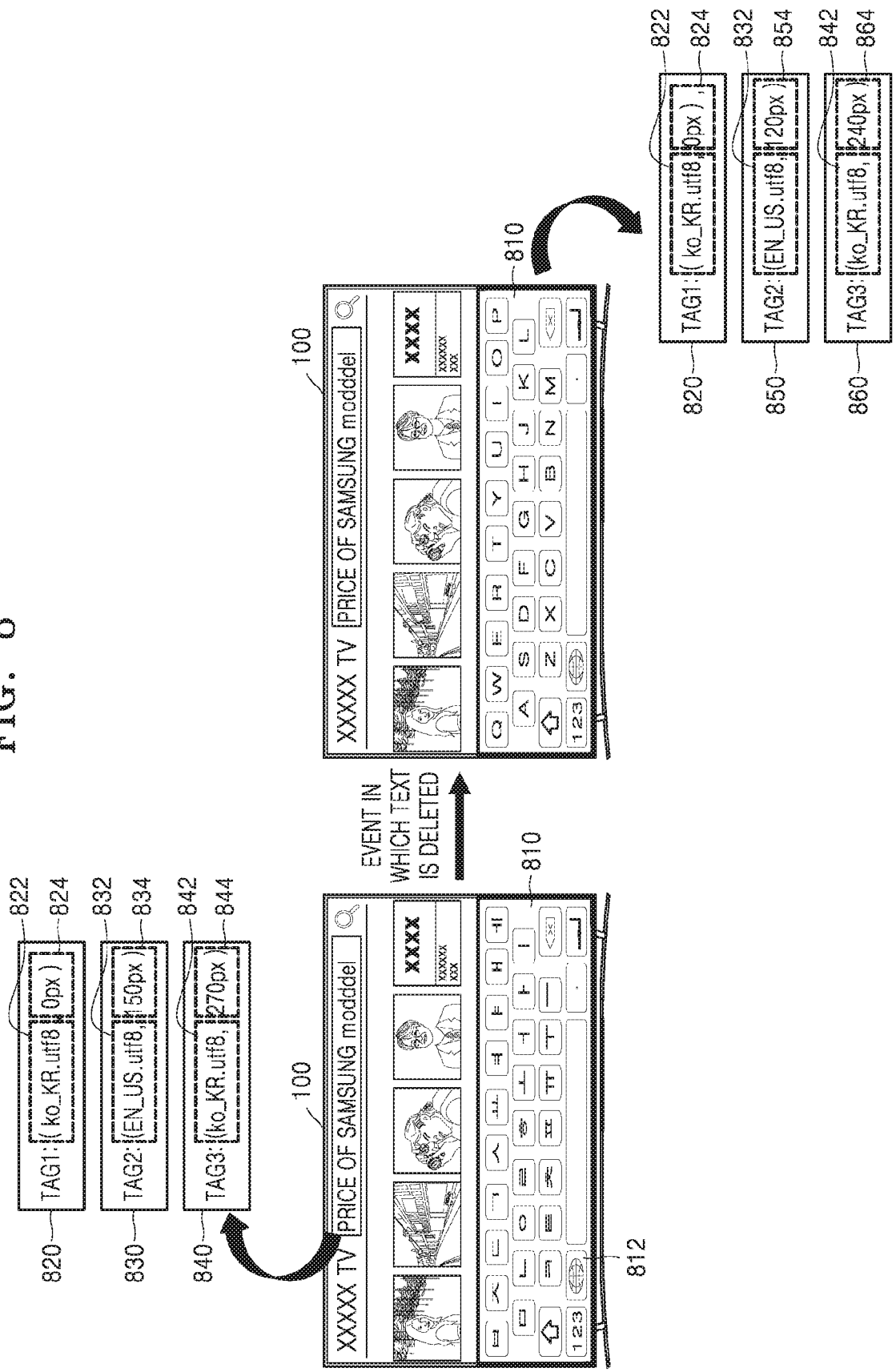
FIG. 8 is a diagram illustrating a method of updating tag information in a terminal when a text delete event occurs, according to an embodiment.

FIG. 8 is a diagram illustrating a method of updating tag information in the terminal 100 when a text delete event occurs, according to the embodiment.

Referring to FIG. 8, the terminal 100 may generate first tag information 820 when a UI 810 for inputting text is executed. The first tag information 820 may include information 822 about a kind of language set in the UI 810 for inputting text, and information 824 about a location of the cursor at the time of starting text input. In the embodiment, it is assumed that the information 822 about the kind of language and the information 824 about the location of the cursor included in the first tag information are respectively Korean and 0 px.

Also, when a first language switch request is received after a text "삼성" is input to the terminal 100, second tag information 830 may be generated. The second tag information 820 may include information 832 about the kind of switched language and information 834 about a location of the cursor at the time of receiving the first language switch request. When a language switch key 812 is touched, the language switch request may be received. In the embodiment, it is assumed that the information 832 about the kind of language and the information 834 about the location of the cursor included in the second tag information are respectively English and 150 px.

When a second language switch request is received after a text "modddel" is input to the terminal 100, third tag information 840 may be generated. Also, the third tag information 840 may include information 842 about a kind of re-switched language and information 844 about a location of the cursor at the time of receiving the second language switch request. In the embodiment, it is assumed that the information 842 about the kind of language and the information 844 about the location of the cursor included in the second tag information respectively include Korean and 270 px.

In addition, when an event of deleting text included in an event of moving the cursor in a direction different from a preset direction occurs, the terminal 100 may update the at least one tag information (e.g., 830 and 840). For example, in the terminal 100, an event of deleting 'dd' from the text "modddel" may occur. The terminal 100 may identify that a pixel section corresponding to the text "dd" is removed when the event of deleting text occurs.

Also, the terminal 100 may update at least one piece of tag information (e.g., 830 and 840) by applying a length of the removed pixel section to the location information of the cursor included in at least one piece of tag information (e.g., 830 and 840). For example, the terminal 300 may subtract 30 px, that is, a length of the pixel section corresponding to "dd", from the location information of the cursor included in the second tag information 830 and the location information of the cursor included in the third tag information 840. Accordingly, the location information 854 of the cursor included in the updated second tag information 850 may be set to have 120 px. Also, location information 864 of the cursor included in the updated third tag information 860 may be set to have 240 px.

Figure 9:
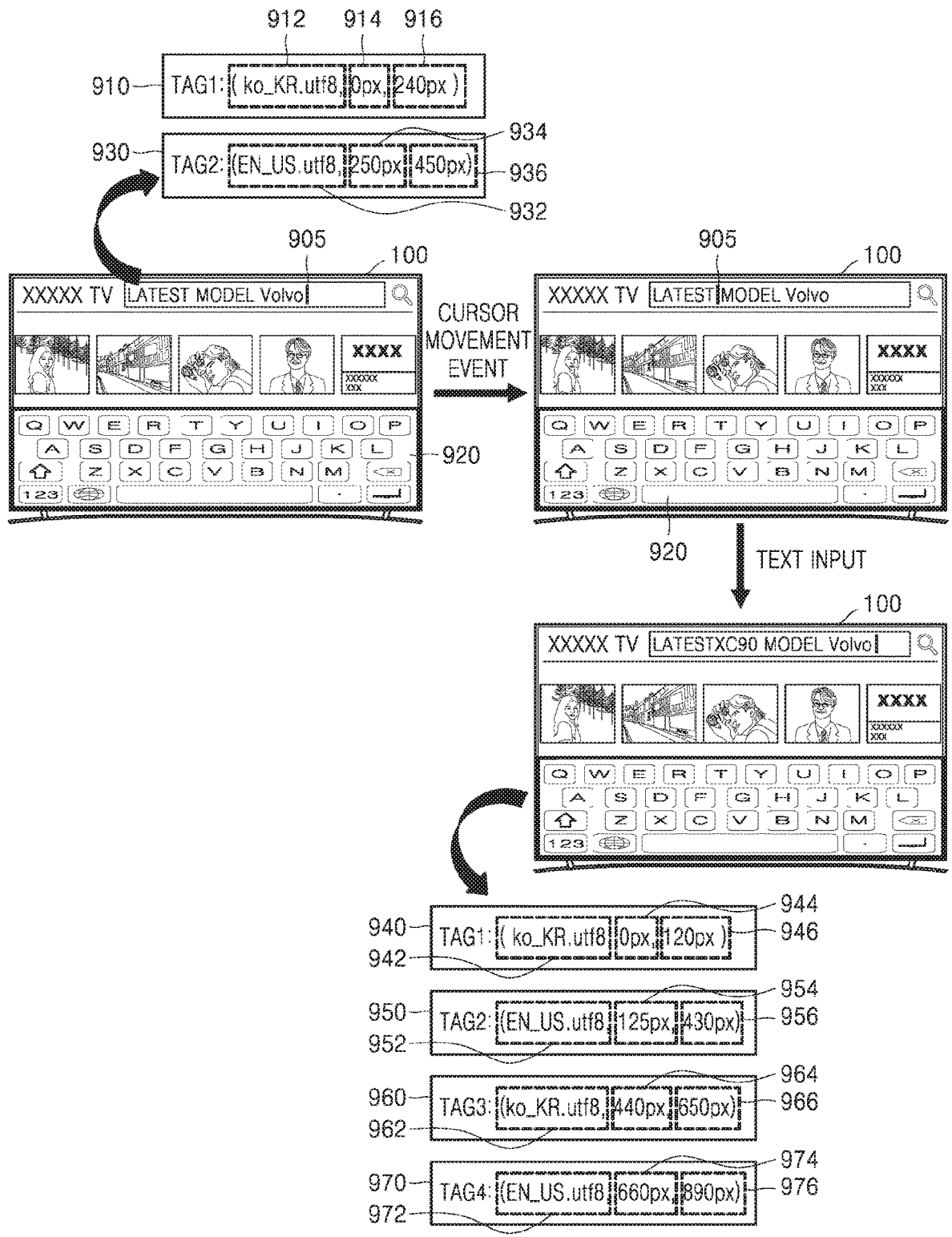
FIG. 9 is a diagram illustrating a method of updating tag information in a terminal when a cursor movement event occurs, according to an embodiment.

FIG. 9 is a diagram illustrating a method of updating tag information in the terminal 100 when an event of moving cursor occurs, according to another embodiment.

In FIG. 9, it is assumed that the tag information for recognizing text may also include information about a location of a cursor 905 at the time when the text input is finished, as well as a location of the cursor 905 at the time when the text input starts.

Referring to FIG. 9, the terminal 100 may generate first tag information 910 when a UI (not shown) for inputting text is executed. Here, the first tag information 910 may include information 912 about a kind of language initially set in the UI for inputting text, information 914 about a location of the cursor at the time when the text input has started, and information 916 about a location of the cursor at the time of finishing the text input. Here, the time of finishing the text input denotes a time when the text input is finished before the language is switched. Also, in the embodiment, the information 912 about the kind of language, the information 914 about the location of the cursor 905 at the time when the text input has started, and the information 916 about the location of the cursor 905 at the time of finishing the text input included in the first tag information 910 may respectively include Korean, 0 px, and 240 px.

Also, when a language switch request is received to the terminal 100 after a text "latest model" is input, second tag information 930 may be generated. The second tag information 930 may include information 932 about a kind of language set in a UI 920 for inputting text in a switched language, information 934 about a location of the cursor at the time of receiving the language switch request, and information 936 about the location of the cursor 905 at the time of finishing the text input. In the embodiment, it is assumed that the information 922 about the kind of language, the information 924 about the location of the cursor 905 at the time when the text input has started, and the information 926 about the location of the cursor 905 at the time of finishing the text input included in the second tag information 920 respectively include English, 250 px, and 450 px.

In addition, when an event of moving the cursor in a direction different from a preset direction occurs after a text "Bxx" is input to the terminal 100, the terminal 100 may update at least one piece of tag information (e.g., 910 and 920). For example, in the terminal 100, an event of moving the cursor to an intermediate point of the text "latest model" may occur. Also, after the event of moving the cursor, the terminal 100 may obtain a text "XC90".

Accordingly, the terminal 100 may determine a location of the text "XC90" and a length of the pixel section, by identifying a starting point and a finishing point of the cursor 905 in the text obtained after the event of moving the cursor. Also, the terminal 100 may update the at least one piece of tag information (910 and 920) by applying the location and the length of the pixel section of the text "XC90" to the location information of the cursor 905 included in the at least one piece of tag information.

For example, the terminal 100 may generate updated first tag information 940 corresponding to the text "latest". In the embodiment, information 942 about the kind of language, information 944 about the location of the cursor 905 at the time when the text input has started, and information 946 about the location of the cursor 905 at the time of finishing the text input included in the updated first tag information 940 may respectively include Korean, 0 px, and 120 px.

Also, the terminal 100 may generate updated second tag information 950 corresponding to the obtained text "XC90". In the embodiment, information 952 about the kind of language, information 954 about the location of the cursor 905 at the time when the text input has started, and information 956 about the location of the cursor 905 at the time of finishing the text input included in the updated second tag information 950 may respectively include English, 125 px, and 430 px.

The terminal 100 may additionally generate third tag information 960 corresponding to a text "model". In the embodiment, information 962 about the kind of language, information 964 about the location of the cursor 905 at the time when the text input has started, and information 966 about the location of the cursor 905 at the time of finishing the text input included in the third tag information 960 may respectively include Korean, 440 px, and 650 px.

The terminal 100 may additionally generate fourth tag information 970 corresponding to a text "Bxx". In the embodiment, information 972 about the kind of language, information 974 about the location of the cursor 905 at the time when the text input has started, and information 976 about the location of the cursor 905 at the time of finishing the text input included in the fourth tag information 970 may respectively include English, 660 px, and 890 px.

However, one or more embodiments are not limited to the above example, but the tag information for recognizing text may include information about a text input time. When the tag information includes information about the text input time, the terminal 100 may update tag information when the event of moving the cursor occurs, based on the information about the text input time.

Figure 10:
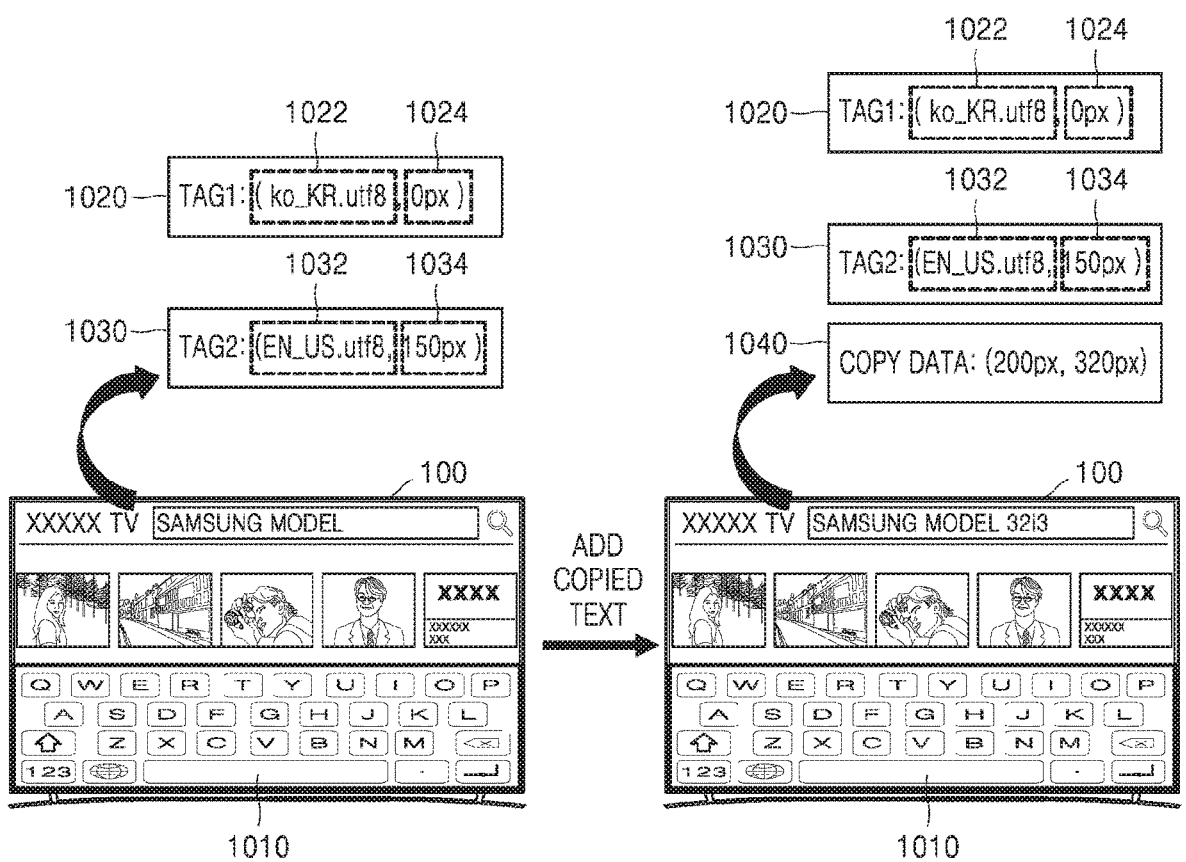
FIG. 10 is a diagram illustrating a method of updating tag information in a terminal when an event of adding copied text occurs, according to an embodiment.

FIG. 10 is a diagram illustrating a method of updating tag information in the terminal 100 when an event of adding copied text occurs, according to an embodiment.

Referring to FIG. 10, the terminal 100 may generate first tag information 1020 and second tag information 1030 according to an input of a text "삼성 model". The first tag information 1020 may include information 1022 about a kind of language initially set in the UI for inputting text, and information 1024 about a location of the cursor at the time of starting text input. In the embodiment, it is assumed that the information 1012 about the kind of language and the information 1024 about the location of the cursor included in the first tag information 1020 respectively include Korean and 0 px.

Also, the second tag information 1020 may include information 1022 about the kind of language set in a UI 1010 for inputting text and information 1024 about a location of the cursor at the time of receiving a language switch request, after receiving the language switch request. In the embodiment, it is assumed that the information 1032 about the kind of language and the information 1034 about the location of the cursor included in the second tag information 1030 respectively include English and 150 px.

In addition, an event of adding a copied text "32i3" may occur in the terminal 100. When an event of adding the copied text occurs in the terminal 100, the terminal 100 may store information 1030 about a region to which the copied text is added and about the copied text. In the embodiment, it is assumed that a region to which the copied text is added corresponds to a region between 200 px and 300 px.

The terminal 100 may not perform a process of recognizing text with respect to the copied text. Since recognition of the copied text is performed at the time of copying the text in the terminal 100, the terminal 100 may perform the recognition with respect to the other text than the copied text. Accordingly, the terminal 100 may recognize the text displayed on the screen of the terminal 100 by combining the recognized text with the copied text.

Figure 11:
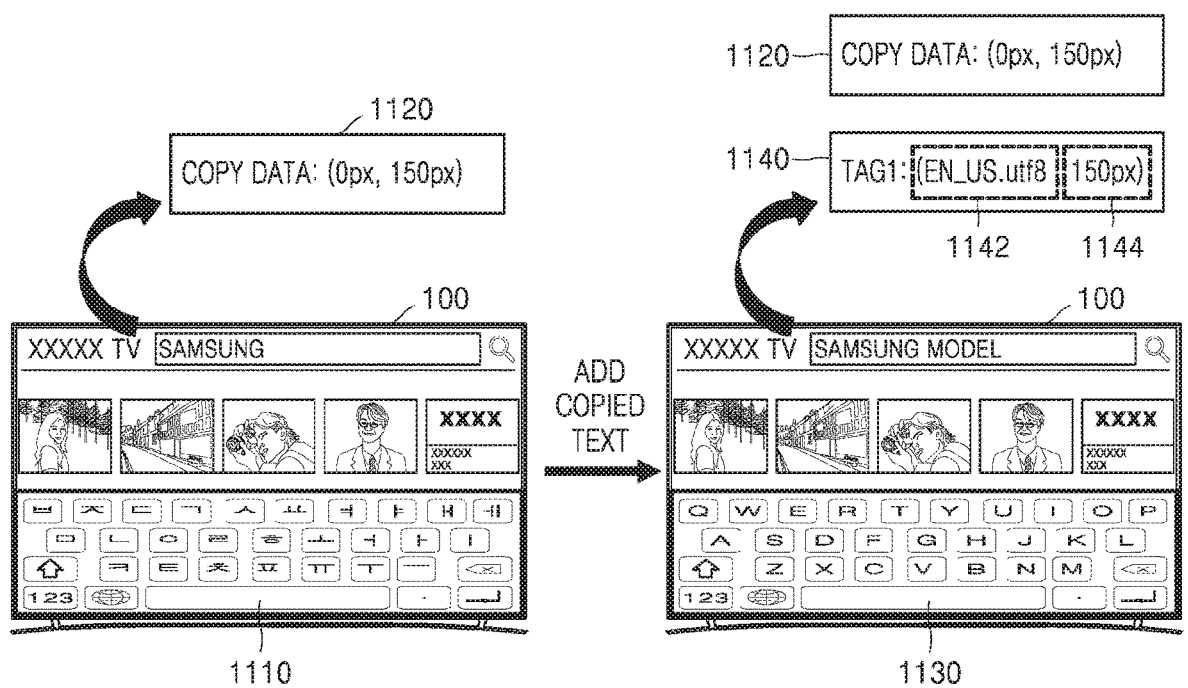
FIG. 11 is a diagram illustrating a method of updating tag information in a terminal when an event of adding copied text occurs, according to another embodiment.

FIG. 11 is a diagram illustrating a method of updating tag information in the terminal 100 when an event of adding copied text occurs, according to another embodiment.

Referring to FIG. 11, the terminal 100 may display a UI 1110 for inputting text. In addition, an event of adding a copied text "삼성" may occur in the terminal 100. When an event of adding the copied text occurs in the terminal 100, the terminal 100 may store information 1120 about a region to which the copied text is added and about the copied text. In the embodiment, it is assumed that a region to which the copied text is added corresponds to a region between 0 px and 150 px.

In addition, when receiving a language switch request, the terminal 100 may generate second tag information 1140. The second tag information 1140 may include information 1142 about a kind of switched language set in a UI 1130 for inputting text and information 1144 about a location of the cursor at the time of receiving the language switch request. In the embodiment, it is assumed that the information 1142 about the kind of language and the information 1144 about the location of the cursor included in the second tag information are respectively English and 150 px.

The terminal 100 may not perform a process of recognizing text with respect to the copied text. Since recognition of the copied text is performed at the time of copying the text in the terminal 100, the terminal 100 may perform the recognition with respect to the other text than the copied text. Accordingly, the terminal 100 may recognize the text displayed on the screen of the terminal 100 by combining the recognized text with the copied text.

The method according to the embodiments of the disclosure may be recorded in computer-readable media including program commands to implement various operations embodied by a computer. The computer-readable media may also include, alone or in combination with the program commands, data files, data structures, etc. The media and program commands may be those specially designed and constructed for the purposes, or they may be of the kind well-known and available to those of skill in the computer software arts. Examples of computer-readable media include magnetic media such as hard disks, floppy disks, and magnetic tape; optical media such as CD ROM disks and DVD; magneto-optical media such as floptical disks; and hardware devices that are specially to store and perform program commands, such as read-only memory (ROM), random access memory (RAM), flash memory, etc. Examples of the program commands may include not only machine language codes but also high-level language codes which are executable by various computing means by using an interpreter.

Apparatuses according to the embodiments may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer-readable recording medium may also be distributed over network coupled computer systems so that the computer readable code is stored and executed in a distributive manner. This media may be read by the computer, stored in the memory, and executed by the processor.

Reference has been made to the exemplary aspects illustrated in the drawings, and specific language has been used to describe these aspects. However, no limitation of the scope of the presently disclosed embodiment is intended by this specific language, and the presently disclosed embodiment should be construed to encompass all embodiments that would normally occur to one of ordinary skill in the art.

The present embodiments may be described in terms of functional block components and various processing steps. The functional blocks may be implemented as variety numbers hardware and/or software configurations executing certain functions. For example, the present disclosure may adopt direct circuit configurations such as a memory, processing, logic, look-up table, etc. that may perform various functions according to control of one or more microprocessors or other control devices. Also, the embodiments may adopt cores of the same kind or different kinds, and CPUs of different kinds. In a similar manner to that in which the elements of the present disclosure may be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented in algorithms that are executed on one or more processors. Also, the embodiments may employ any number of techniques according to the related art for electronics configuration, signal processing and/or control, data processing and the like. The terms "mechanism", "element", "means" and "configuration" may be widely used and are not limited to mechanical and physical configurations. The above terms may include software routines in conjunction with processors, etc.

The particular implementations shown and described herein are illustrative examples of the embodiments and are not intended to otherwise limit the scope of the embodiments in any way. For the sake of brevity, electronics, control systems, software, and other functional aspects of the systems according to the related art may not be described in detail. Furthermore, the connecting lines or connectors shown in the drawings are intended to represent example functional relationships and/or physical or logical couplings between the various elements. It should be noted that many alternative or additional functional relationships, physical connections, or logical connections may be present in a practical device. Moreover, no item or component is essential to the practice of the present disclosure unless the element is specifically described as "essential" or "critical".

The singular forms "a," "an" and "the" in the specification of the embodiments, in particular, claims, may be intended to include the plural forms as well. Unless otherwise defined, the ranges defined herein is intended to include values within the range as individually applied and may be considered to be the same as individual values constituting the range in the detailed description. Finally, operations constituting methods may be performed in appropriate order unless explicitly described in terms of order or described to the contrary. Exemplary embodiments are not necessarily limited to the order of operations given in the description. The examples or exemplary terms (for example, etc.) used herein are to merely describe exemplary embodiments in detail are not intended to limit the embodiments unless defined by the following claims. Also, those of ordinary skill in the art will readily appreciate that many alternations, combinations and modifications, may be made according to design conditions and factors within the scope of the appended claims and their equivalents.

The invention claimed is:

1. A method of recognizing text in a terminal, the method comprising:
   generating first tag information about a kind of language set in a user interface (UI) for inputting text and a location of a cursor at a time point when a text input has started, when the UI for inputting text displayed on the terminal is executed;
   when a language switch request that requests the terminal to switch the kind of language set in the UI is received, generating second tag information about a kind of switched language and a location of the cursor at a time point of receiving the language switch request;
   when the text input is finished, storing a screen image of the terminal; and
   recognizing the text input to the terminal based on at least one piece of tag information and the screen image.

2. The method of claim 1, further comprising
   identifying a kind of an application being displayed on a screen of the terminal, on which the UI is displayed,
   wherein the generating of the first tag information comprises
   generating the first tag information when the kind of the application that is identified is included in a target application list set in advance.

3. The method of claim 1, further comprising
   recognizing at least one icon displayed on a screen of the terminal, on which the UI is displayed,
   wherein the generating of the first tag information comprises
   generating the first tag information when the icon is included in a target icon set in advance.

4. The method of claim 1, wherein the recognizing of the text comprises:
   obtaining a target region from the screen image for recognizing the text, based on the information about the location of the cursor included in the at least one piece of tag information; and
   recognizing the text in the obtained target region based on the information about the kind of language included in the at least one piece of tag information.

5. The method of claim 1, further comprising
   when an event in which the location of the cursor is changed to a direction different from a preset direction occurs, updating the at least one piece of tag information based on a location of the cursor after the event.

6. The method of claim 1, further comprising:
   when an event in which copied text is added occurs in the terminal, storing information about a location of the cursor at a time point when the event occurs and the copied text; and
   updating the at least one piece of tag information based on the stored information.

7. The method of claim 1, wherein the at least one piece of tag information further comprises
   information about at least one of a time of finishing the text input and a time of inputting text for each kind of language.

8. A terminal for recognizing text, the terminal comprising:
   an output unit configured to display a user interface (UI) for inputting text to the terminal;
   a processor configured to, when the UI is executed, generate first tag information about a kind of language set in the UI and a location of a cursor at a time when a text input has started, and when a language switch request that requests the terminal to switch the kind of language set in the UI is received in the terminal, generate second tag information about a kind of switched language and a location of the cursor at a time point of receiving the language switch request; and
   a memory storing a screen image of the terminal when the text input is finished,
   wherein the processor is configured to
   recognize the text input to the terminal based on the at least one piece of tag information and the stored screen image.

9. The terminal of claim 8, wherein the processor is configured to
   identify a kind of an application being displayed on a screen of the terminal, on which the UI is displayed, and generate the first tag information when the identified application is included in a target application list set in advance.

10. The terminal of claim 8, wherein the processor is configured to
    recognize at least one icon displayed on a screen of the terminal, on which the UI is displayed, and generate the first tag information when the recognized icon is included in a target icon set in advance.

11. The terminal of claim 8, wherein the processor is configured to
    obtain a target region for recognizing text from the screen image based on the information about the location of the cursor included in the at least one piece of tag information, and recognize the text in the target region based on the information about the kind of language included in the at least one piece of tag information.

12. The terminal of claim 8, wherein the processor is configured to,
    when an event in which the location of the cursor is changed to a direction different from a preset direction occurs, update the at least one piece of tag information based on a location of the cursor after the event.

13. The terminal of claim 8, wherein the processor is configured to,
    when an event of adding copied text occurs in the terminal, store information about a location of the cursor at a time point when the event has occurred and the copied text, and update the at least one piece of tag information based on the stored information.

14. The terminal of claim 8, wherein the at least one piece of tag information further comprises
    information about at least one of a time of finishing the text input and a time of inputting text for each kind of language.

15. A computer-readable recording medium having recorded thereon a program for performing the method of claim 1.

* * * * *